(12) United States Patent
Joshi (10) Patent No.: US 12,217,097 B2
(45) Date of Patent: Feb. 4, 2025

(54) DISTRIBUTED EDGE COMPUTING SYSTEM AND METHOD

(71) Applicant: Rakuten Mobile, Inc., Tokyo (JP)

(72) Inventor: Hiren Joshi, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/642,203

(22) PCT Filed: Feb. 15, 2022

(86) PCT No.: PCT/US2022/016375
§ 371 (c)(1),
(2) Date: Mar. 10, 2022

(87) PCT Pub. No.: WO2023/158417
PCT Pub. Date: Aug. 24, 2023

(65) Prior Publication Data
US 2024/0045730 A1    Feb. 8, 2024

(51) Int. Cl.
G06F 9/50     (2006.01)
H04L 61/4511  (2022.01)
H04L 61/50    (2022.01)
H04L 67/10    (2022.01)

(52) U.S. Cl.
CPC ............ *G06F 9/5072* (2013.01); *H04L 67/10* (2013.01); *G06F 9/5005* (2013.01); *G06F 2209/5014* (2013.01); *H04L 61/4511* (2022.05); *H04L 61/50* (2022.05)

(58) Field of Classification Search
CPC ..... H04L 61/4511; H04L 61/50; H04L 67/10; G06F 9/5005; G06F 2209/5014; G06F 9/5072
See application file for complete search history.

(56) References Cited

U.S. PATENT DOCUMENTS

| | | | |
|---|---|---|---|
| 7,782,792 B2 * | 8/2010 | Beygelzimer | G06Q 10/0639 370/252 |
| 2009/0276519 A1 * | 11/2009 | Alimi | G06F 9/5072 709/224 |
| 2010/0169893 A1 * | 7/2010 | Collins | H04L 12/1453 718/105 |
| 2016/0350420 A1 * | 12/2016 | Ranjan | H04L 67/10 |

(Continued)

FOREIGN PATENT DOCUMENTS

| | | |
|---|---|---|
| EP | 3846417 A1 | 7/2021 |
| WO | 2021138069 A1 | 7/2021 |

*Primary Examiner* — Andrew C Georgandellis
(74) *Attorney, Agent, or Firm* — HAUPTMAN HAM, LLP (57) ABSTRACT a method for distributed edge computing (DEC) includes obtaining a request from a computational resource provider (CRP) offering computational resources of the CRP; validating the computation resources of the CRP; offering the computation resources of the CRP to a computational resource consumer (CRC); obtaining a reservation request from the CRC for a portion of the computation resources of the CRP; and installing CRC software on the CRP for DEC, where the CRP is configured to receive produced data related to the CRC software from a first localized device, the computational resources process the produced data, and forward processed data to a second localized device that has requested the processed data.

20 Claims, 7 Drawing Sheets

(56) References Cited

U.S. PATENT DOCUMENTS

| | | | |
|---|---|---|---|
| 2019/0065249 A1* | 2/2019 | Cheng | G06F 9/4881 |
| 2019/0140919 A1 | 5/2019 | Smith et al. | |
| 2021/0144517 A1 | 5/2021 | Guim Bernat et al. | |
| 2021/0365348 A1* | 11/2021 | Kuperman | G06F 11/328 |

* cited by examiner

DISTRIBUTED EDGE COMPUTING SYSTEM AND METHOD

RELATED APPLICATIONS

The present application is a National Phase of International Application No. PCT/US2022/016375 filed Feb. 15, 2022.

BACKGROUND

Distributed computing is a field of computer science that studies distributed systems. A distributed system is a system whose components are located on different networked computers, which communicate and coordinate their actions by passing messages to one another from any system. The components interact with one another in order to achieve a common goal. Distributed computing also refers to the use of distributed systems to solve computational problems. In distributed computing, a problem is divided into many tasks, each of which is solved by one or more computers, which communicate with each other via message passing.

BRIEF DESCRIPTION OF THE DRAWINGS

Aspects of the present disclosure are best understood from the following detailed description when read with the accompanying FIGS. In accordance with the standard practice in the industry, various features are not drawn to scale. In fact, the dimensions of the various features are arbitrarily increased or reduced for clarity of discussion.

DETAILED DESCRIPTION

The following disclosure provides many different embodiments, or examples, for implementing different features of the subject matter. Examples of components, values, operations, materials, arrangements, or the like, are described below to simplify the present disclosure. These are examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to be in direct contact. In addition, the present disclosure repeats reference numerals and/or letters in the various examples. This repetition is for the purpose of simplicity and clarity and does not dictate a relationship between the various embodiments and/or configurations discussed.

Further, spatially relative terms, such as "beneath," "below," "lower," "above," "upper" and the like, are used herein for ease of description to describe one element or feature's relationship to other element(s) or feature(s) as illustrated in the FIGS. The spatially relative terms are intended to encompass different orientations of the device in use or operation in addition to the orientation depicted in the FIGS. The apparatus is otherwise oriented (rotated 90 degrees or at other orientations) and the spatially relative descriptors used herein likewise are interpreted accordingly.

In some embodiments, a distributed edge computing system (DECS) is configured to flexibly pool computing resources across multiple distributed devices. In some embodiments, a DECS is configured to connect distributed devices that are both consumers and producers of data with other distributed devices that include available computing resources for both the data consumers and producers. In some embodiments, data producers provide and data consumers consume data respectively pursuant to instructions from a respective application. In some embodiments, a DECS distributed device (DECS-D) receives data from data producers. In some embodiments, the DECS-D processes the received data pursuant to instructions from the application with resources committed for DECS usage as instructed by the application. In some embodiments, the DECS-D sends the processed data to the consumers of the data as instructed by the application. In some embodiments, unused or offered computing capacity of a DECS-D is utilized pursuant to a dynamic requirement of the application. In some embodiments, a DECS management system (DECS-M) manages DECS-Ds to process information from data producers and send the processed data to the devices consuming the processed information based on instructions from respective applications. In some embodiments, the DECS-D is a mobile device located on the edge of a network that participates in a DECS processing resources program. In some embodiments, the edge of the network consists of data producers, data consumers, and DECS-Ds for processing the data produced and providing the data to the data consumers.

In a non-limiting example, one or more data producers, one or more data consumers, and one or more DECS-Ds are in a localized area. Continuing with the non-limiting example, a data consumer's vehicular system is searching for an up-to-date traffic situation. The vehicular system transmits a request to a DECS-D requesting an up-to-date traffic situation. Within the same localized area, multiple computing devices are generating the relevant traffic information. The DECS-D acquires the relevant traffic data from the computing devices and provides the up-to-date traffic situation to the vehicular system. Continuing with the non-limiting example, increased processing demand in the localized area encourages mobile device users in the localized area to participate in the DECS with their devices. Mobile device users on the edge of a network are able to designate their devices as a DECS-D and offering their mobile devices for data processing. In some embodiments, mobile device owners are able to enter into a contract offering a portion of the mobile device processing capacity for remuneration (e.g., by owners of applications). In some embodiments, the remuneration for the use of mobile device computing resources, makes the owners of the mobile devices more likely to contribute to a DECS system and provide more computing resources to the DECS. User devices (e.g., biometric devices, smartphones, laptops, and the like) are producers of data and consumers of the processed data.

In other approaches, processing of data occurs at respective servers associated with the user devices located distant from the servers. Based on requested data, processed data is exchanged across servers for processing and decision making. The data transfer, data processing and response times are low. However, distributed computing capacity of servers leads to a large inefficiency. Also, scaling-in and scaling-out is time and cost intensive as servers are added, moved, or removed. In these prior approaches, data and processing is completely distributed, but the resource pooling is poor, and the time required to scale is large.

In other approaches, such as cloud networking, data is transferred to a remote centralized location for processing. Thus, allowing the pooling of computational resources across multiple devices and users. Inefficient computing resource utilization is eliminated by the pooling of computing capacity through cloud computing. Data from respective consumers is pooled to the cloud network, processed, and distributed to the consumers. Pooled capacity across consumers and producers and faster scaling of resources are just some of the advantages of cloud networks. However, heavy data transfers across backhaul networks and latency due to the remote location of the processing resources are just some of the disadvantages of a cloud network.

Cloud computing is the on-demand availability of computer system resources, especially data storage (cloud storage) and computing power, without direct active management by the user. Large clouds often have functions distributed over multiple locations, each location being a data center.

In other approaches, such as a fog network, data consolidation and processing are brought closer to user. Pooling of computational resources is reduced with backhaul utilization, and latency is improved as the computational resources are closer to the user. Fog networks bring computing resources closer to the backhaul network to reduce latency. Fog networks optimize resource pooling and decrease backhaul utilization and latency. However, with the increase in industry demand for ever lower latency and higher data volume consumption; latency remains too high for consumers searching for a faster response. Further, fog networks increase the loading of access networks (a type of telecommunications network, such as a RAN, which connects subscribers to their immediate service provider).

Further known as fogging, fog computing facilitates the operation of computing, storage, and networking services between end devices and cloud computing data centers. While fog computing is typically referred to the location where services are instantiated, fog computing implies distribution of the communication, computation, storage resources, and services on or close to devices and systems in the control of end-users. Fog computing is a medium weight and intermediate level of computing power. Rather than a substitute, fog computing often serves as a complement to cloud computing.

In another suggested approach, edge clouds provide data consolidation and processing even closer to the user than fog networks (e.g., at the access network). Pooling of computational resources is further reduced and response time and backhaul utilization is further improved. Computing resources are brought even closer to the devices with an edge cloud. Nevertheless, edge clouds increase dependency on access network service providers. Increasing demands due to ultra-low latency applications, such as virtual reality (VR) (entertainment (particularly video games), education (such as medical or military training) and business (such as virtual meetings)), augmented reality (AR) (interactive experience of a real-world environment where the objects that reside in the real world are enhanced by computer-generated perceptual information, sometimes across multiple sensory modalities), vehicle-to-everything (V2X) (is communication between a vehicle and any entity that affects, or may be affected by, the vehicle), and the like, push for an even further reduction in latency and faster processing of resources.

Edge computing is a distributed computing paradigm that brings computation and data storage closer to the sources of data. This improves response times and saves bandwidth.

In other approaches, there is a balance between limited and rigid architectural solutions versus multiple and varying computational resource demands spread across different localities. Currently, no solution exists for processing that is handled locally outside the data producing devices. Other approaches, include inefficient infrastructure utilization due to limited pooling across computational resources. There currently exists no pooling at a distributed level. Cloud computing is limited at an enterprise level (e.g., something that's knowledge-intensive and a significant investment). These other approaches have overlooked direct communication among localized devices. This results in a lack of localization and higher demand on a transport network for exchanging data with a centralized infrastructure.

Currently, the most pervasive electronic devices are mobile devices. Current mobile device computer processing units (CPUs) provide computational resources (e.g., the number of CPUs, the speed of the CPUs, the random-access memory (RAM) storage, and the internal storage) that are quickly approaching the computational resources of data center CPUs within cloud networks. Current mobile handsets provide CPUs and memory that are able to handle most applications. Mobile device usage during lean hours is between 10% to 30% of a mobile device's peak dimensioned capacity (based on background applications operating). Thus, most devices have between 70% and 90% of computing capacity sitting unused. Further, when the mobile device owner is sleeping or resting even greater computing capacity sits unused.

User Devices, including mobile phones, laptops, local servers, and the like, are built for managing higher computing loads to manage occasional peaks in usage. However, the user device remains idle for substantial amounts of time. For example, mobile devices remain almost entirely idle during late-night hours.

In some embodiments, a move is suggested from hyper threading (HTT) to distributed threading. HTT is simultaneous multithreading (SMT) implementation used to improve parallelization of computations (doing multiple tasks at once) performed on microprocessors. Distributed threading is a system whose components are located on different networked computers (e.g., different mobile devices on a network), which communicate and coordinate actions by passing messages to one another from any system. The components interact with one another to achieve a common goal.

In some embodiments, several user devices are available with higher processing capabilities (processing, memory & storage) with unused computing power. In some embodiments, DECS fulfills application demands and in-turn incentivizes others (such as mobile device users through monetary compensation) to turn mobile devices into DECS-D machines. Thus, DECS growth is demand driven, locality sensitive, and a passive source of income for a contributor.

Users are encouraged to participate in DECS by compensation for the user of computing resources and the computation resources provide augmenting computing capacity. Through localization and consumer-demand driven infrastructure augmentation, varied computational requirements keep updating and growing.

A wide variety of resource requirements are expected to emerge with varied requirements on computational resources, latency, data volume transactions, guaranteed performance, and the like. In some embodiments, DECS meets computational requirements keeping up with the varied demands of data producers & consumers and reducing latencies (e.g., latencies of approximately 5 ms). In some embodiments, DECS accomplishes this through distributed elemental, individual centric, and idle computational resources access to a pooled community. In some embodiments, DECS passes these benefits to the service provider through quality of service (QoS). In some embodiments, DECS provides augmentation of incremental resources for a bigger pool satisfying higher computational requirements. In some embodiments, DECS provides local data/computations requirements at user machines, provides an increase in data, and provides a user perspective ecosystem change. In some embodiments, as users experience the improved performance of DECS, other users are incentivized to use personal machines as DECS-D.

Figure 1:
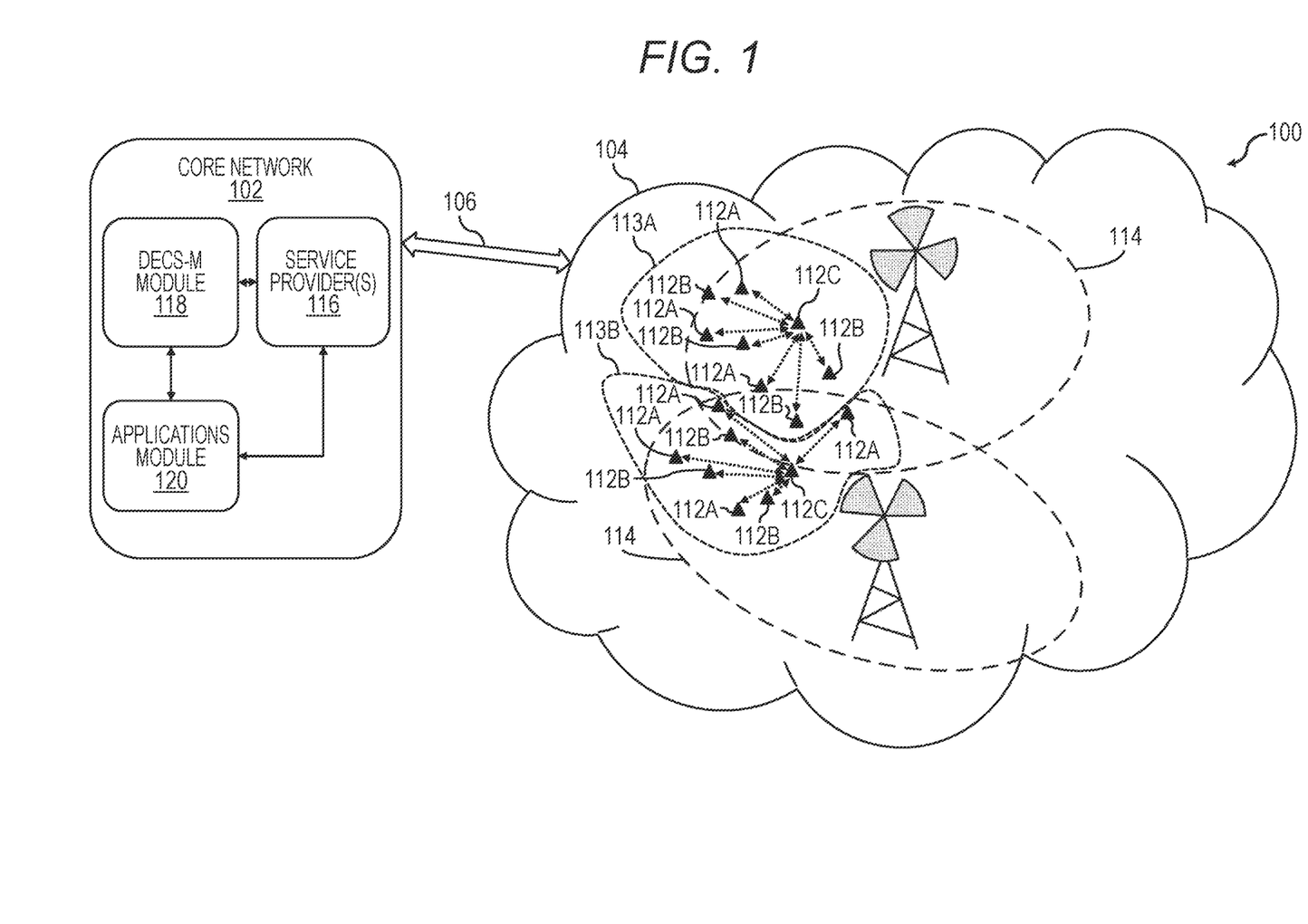
FIG. 1 is a diagrammatic representation of a distributed edge computing system (DECS), in accordance with some embodiments.

FIG. 1 is a diagrammatic representation of a distributed edge computing system (DECS) 100, in accordance with some embodiments.

DECS 100 includes a core network 102 communicatively connected to RAN 104 through backhaul 106, which is communicatively connected to base stations, with antennas that are wirelessly connected to user equipment UEs 112A, 112B, and 112C (together referred to as UE 112) located in geographic coverage areas 114. Core network 102 includes one or more service provider(s) 116, DECS-M module (DECS-MM) 118, and applications module 120.

Core network 102 (also known as a backbone) is a part of a computer network which interconnects networks, providing a path for the exchange of information between different local area networks (LANs) or subnetworks. In some embodiments, core network 102 ties together diverse networks in the same building, in different buildings in a campus environment, or over wide geographic areas. In some embodiments, core network 102 is a cloud network.

In some embodiments, RAN 104 is an access network, such as a global system for mobile communications (GSM) RAN, a GSM/EDGE RAN, a universal mobile telecommunications system (UMTS) RAN (UTRAN), an evolved universal terrestrial radio access network (E-UTRAN, open RAN (O-RAN), or cloud-RAN (C-RAN) or it could be any access technology (for example, IEEE 802.11x or 802.15.XX). RAN 104 resides between user equipment 112 (e.g., mobile phone, a computer, or any remotely controlled machine) and core network 102.

In a hierarchical telecommunications network, backhaul portion 106 of DECS 100 comprises the intermediate link(s) between core network 102 and RAN 104. The two main methods of mobile backhaul implementations are fiber-based backhaul and wireless point-to-point backhaul. Other methods, such as copper-based wireline, satellite communications and point-to-multipoint wireless technologies are being phased out as capacity and latency requirements become more stringent in 4G and 5G networks. Backhaul generally refers to the side of the network that communicates with the global Internet. The connection between a base station and UE 112 begins with backhaul 106 connected to core network 102. In some embodiments, backhaul 106 includes wired, fiber optic and wireless components. Wireless sections include using microwave bands and mesh and edge network topologies that use a high-capacity wireless channel to get packets to the microwave or fiber links.

In some embodiments, UEs 112 are a computer or computing system. Additionally, or alternatively, UEs 112 have a liquid crystal display (LCD), light-emitting diode (LED) or organic light-emitting diode (OLED) screen interface, such as user interface (UI) 722 (FIG. 7), providing a touchscreen interface with digital buttons and keyboard or physical buttons along with a physical keyboard. In some embodiments, UEs 112 connect to the Internet and interconnect with other devices. Additionally, or alternatively, UE 112 incorporates integrated cameras, the ability to place and receive voice and video telephone calls, video games, and Global Positioning System (GPS) capabilities. Additionally, or alternatively, UEs run operating systems (OS) that allow third-party applications specialized for capabilities to be installed and run. In some embodiments, UEs 112 are a computer (such as a tablet computer, netbook, digital media player, digital assistant, graphing calculator, handheld game console, handheld personal computer (PC), laptop, mobile internet device (MID), personal digital assistant (PDA), pocket calculator, portable medial player, or ultra-mobile PC), a mobile phone (such as a camera phone, feature phone, smartphone, or phablet), a digital camera (such as a digital camcorder, or digital still camera (DSC), digital video camera (DVC), or front-facing camera), a pager, a personal navigation device (PND), a wearable computer (such as a calculator watch, smartwatch, head-mounted display, earphones, or biometric device), a smart card, or biometric device.

UEs 112A are consumers of data (hereinafter referred to as consumers 112A). In some embodiments, consumers 112A receive processed data streams from UEs 112C which are DECS clients or distributed devices (DECS-D). UEs 112C are herein after referred to as DECS-D 112C. UEs 112B are producers of data (hereinafter referred to as producers 112B). In some embodiments, Producers 112B send data streams to DECS-D 112C for processing. DECS-D 112C include a lightweight agent, provided by an application), for distributed edge computing (DEC) functionality. In some embodiments, Consumers 112A and producers 112B communicate with DECS-D 112C through wireless network interfaces such as BLUETOOTH, WIFI, WIMAX, GPRS, or WCDMA, point-to-point (P2P)/point-to-multipoint (P2MP) communication via IEEE 802.11x or 802.15.XX; or wired network interfaces such as ETHERNET, USB, IEEE-864.

In some embodiments, consumers 112A, producers 112B, and DECS-D 112C are configured to communicate in a localized area, such as localized areas 113A and 113B. In some embodiments, UEs 112A, 112B, and 112C to communicate effectively in localized areas 113A and 113B and maintain low latency (a few msec to micro-seconds). However, DECS 100 is not restricted to localized areas 113A and 113B and consumers 112A, producers 112B, and DECS-D 112C are able to communicate across localized areas 113A and 113B.

Service provider(s) 116 are businesses or organizations that sell bandwidth or network access. Service provider(s) 116 provide direct Internet backbone access to internet service providers and usually access to network access points (NAPs). Service providers are sometimes referred to as backbone providers or internet providers. Service providers consist of telecommunications companies, data carriers, wireless communications providers, Internet service providers, and cable television operators offering high-speed Internet access.

DECS-MM 118 is a DECS manager. In some embodiments, DECS-MM 118 is a centralized DECS 100 controlling agent. In some embodiments, DECS-MM 118 registers DECS-D 112C and augments and distributes incremental resources of DECS-D 112C for consumers 112A and producers 112B. DECS-MM 118 manages DECS-D 112C and interfaces with applications module 120 and applications stored within. In some embodiments, DECS-MM 118 is configured to manage resource allocation. DECS-MM 118 registers DECS-Ds with details of computing resources. A DECS agent is installed on DECS-Ds offered resources (e.g., downloaded from a PlayStore App). The DECS agent is configured to integrate available computing resources with DECS-MM 118. DECS-MM 118 integrates the computing resources to build standard usage tiers (SUTs are standardized models of computational resources clustered to meet different market requirements across computing resource consumers 112A and producers 112B) and update a SUT Library. DECS-MM 118 is configured to reserve and allocate SUTs to DECS-Ds 112C. DECS-MM is configured to handle contract agreements between consumers 112A, producers 112B and DECS-D 112C based on resources lifespan, performance expectations & consequence management.

Applications module 120 stores application programs (application or app for short). Application programs are computer programs designed to carry out a specific task other than one relating to the operation of the computer itself, typically to be used by end-users or remote consumer using data from end-device. Word processors, media players, and accounting software are examples. In some embodiments, applications module 120 provides instructions for consumers 112A and producers 112B regarding the consumption and production of data. In some embodiments, applications module 120 provides instructions to DECS-D 112C regarding computing resources onboard DECS-D 112C committed for DECS 100. In some embodiments, DECS-D 112C fulfils the application module's instructions and in turn, the owner of DECS-D 112C is incentivized (e.g., paid through cash, crypto currencies, or the like). In some embodiments, application module 120 installs and initiates application software on DECS-D 112C. In some embodiments, application module 120 provides domain name system (DNS) address of DECS-D 112C for forwarding data to data producer 112B. In some embodiments, application module 120 intimates source address for reception of data to be sent to consumer 112A. In some embodiments, application module 120 shares credentials to connect consumers 112A and producers 112B with DECS-D 112C within a localized area, such as localized areas 113A and 113B. In some embodiments, DECS-D 112C provides infrastructure resources to process local information received from near-by data producers 112B, process the data pursuant to instructions from application module 120, and pass the processed data to nearby data consumers 112A.

Figure 2:
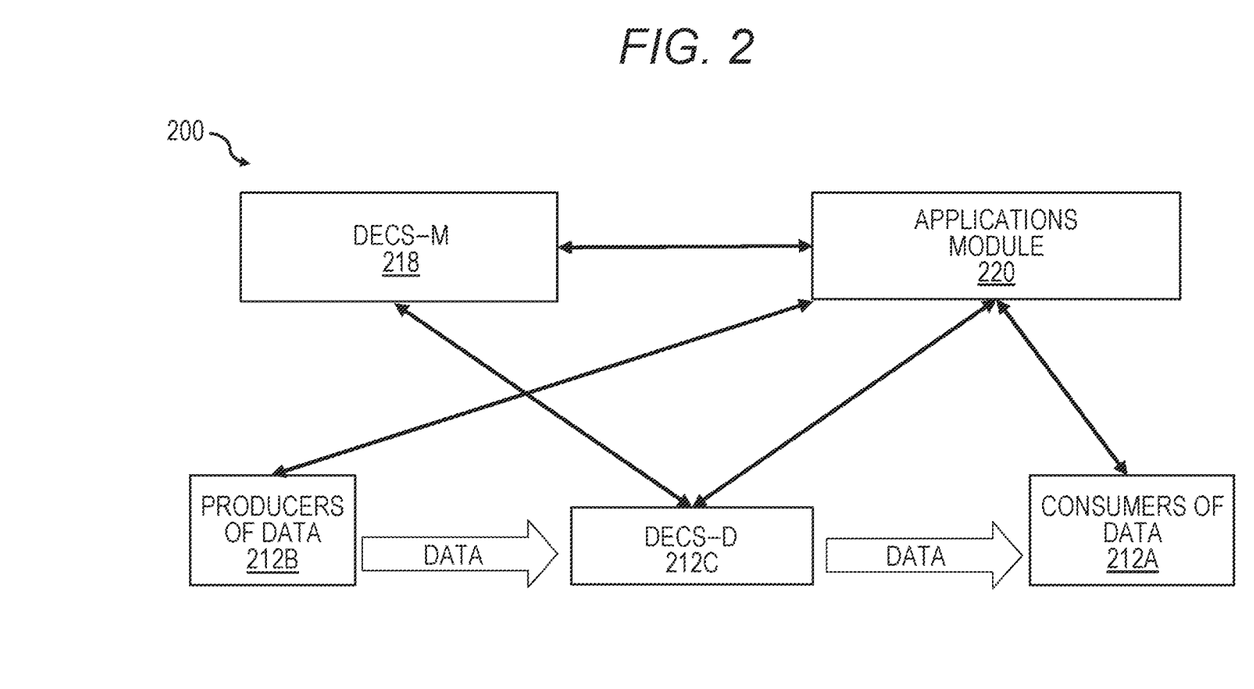
FIG. 2 is a diagram of a DECS, in accordance with some embodiments.

FIG. 2 is a diagram of a DECS 200, in accordance with some embodiments.

Reference numerals for DECS 200 are consistent with the reference numerals of DECS 100. In some embodiments, DECS 200 is like DECS 100. An understanding of DECS 200 is helpful with regards to the discussion of DECS algorithm (DECS-A) 300 (FIG. 3) and the data and information flow between the elements of DECS 200 with a discussion of DECS-A 300.

In some embodiments, DECS 200 operates independently of a network. As discussed later with reference to the examples of FIGS. 4-6, the DECS operates independently of the type of network being utilized for the computing devices. In some embodiments, the network is a wired, wireless, optical, or the like.

Thus, in FIG. 2, DECS 200 is shown independent of the network.

Figure 3:
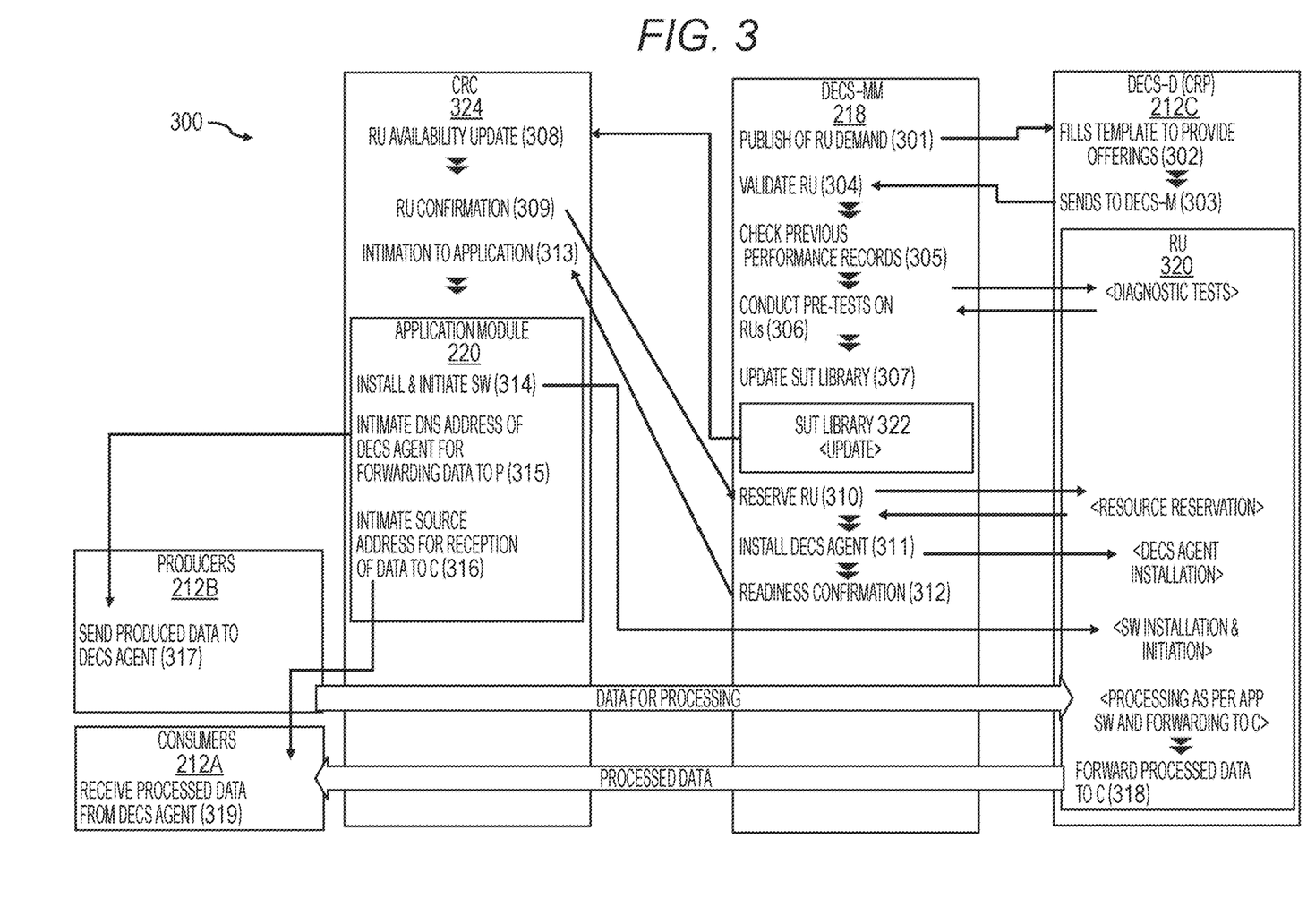
FIG. 3 is a flow diagram of a DECS algorithm (DECS-A), in accordance with some embodiments.

FIG. 3 is a flow diagram of a DECS algorithm (DECS-A) 300, in accordance with some embodiments.

In some embodiments, DECS-A 300 is configured to provide a method for implementing a DECS, such as DECS 200 and DECS 100. While DECS-A 300 is presented in operations 301 through 319, unless specified these operations need not be performed in the order discussed or presented in FIG. 3.

In operation 301 of DECS-A 300, DECS-MM 218 publishes a resource units (RU) demand to DECS-D 212C. In some embodiments, a RU demand is sent in response to a potential DECS-D 212C requesting to become a registered DECS-D 212C. In some embodiments, a potential DECS-D 212C had downloaded a DECS application and desires to engage in a contract to become a DECS-D 212C. RU 304 of DECS-D 212C is infrastructure resource units, such as processors, RAM, storage, and connectivity. DECS-D 212C is a computational resource provider (CRP) and is a lessor of computational resources leasing to a consumer resource user (CRU), such as an application owner. In some embodiments, operation 301 is the registration (or deregistration) of DECS-Ds 212C for resource offerings. Flow process moves from operation 301 to operation 302.

In operation 302 of DECS-A 300, DECS-D 212C fills a RU template (or application) providing the RU data requested by DECS-MM 218. In some embodiments, DECS-D 212C automatically fills the RU template. In some embodiments, an owner of the DECS-D 212C fills in the RU template. In some embodiments, a user provides authorization to DECS-MM 218 to determine the RU capabilities of DECS-D 212C and automatically fills the template based on the device's capabilities. Flow proceeds from operation 302 to operation 303.

In operation 303 of DECS-A 300, DECS-D 212C sends the completed template back to DECS-MM 218. Flow proceeds from operation 303 to operation 304 where DECS-MM 218 validates and registers the RU 320. DECS-D 212C registers with DECS-MM 218 with details of the computing resources available. Flow proceeds from operation 304 to operation 305.

In operation 305 of DECS-A 300, DECS-MM 218 communicates with DECS-D 212C to check performance records for RU 320. Flow proceeds to operation 306 where RU 320 performs diagnostic tests to determine the performance of RU 320. In some embodiments, the diagnostic tests determine duration cycles of availability (e.g., how often is DECS-D 212C available for processing additional data). In some embodiments, the diagnostic tests determine a committed or best-effort availability of DECS-D 212C. In some embodiments, DECS-MM 218 determines a physical location of DECS-112C. In some embodiments, DECS-MM 119 determines the type of connectivity with DECS-D 212C. In some embodiments, a quality of performance of the RU resources and connectivity is evaluated. In some embodiments, reliability performance of RU 320 is determined. In some embodiments, a duration of commitments (e.g., how long with DECS-D 212C be available) is determined (e.g., based on the template from operation 302). In response to the completion of the diagnostic tests, DECS-D 212C returns the results of the diagnostic tests to DECS-MM 218. Flow proceeds from operation 305 to operation 306.

In operation 306 of DECS-A 300, DECS-MM 218 conducts pre-tests on RU 320. In a non-limiting example, DECS-MM 218 performs a simulation of the application requesting the RU processing. In another non-limiting example, DECS-MM has RU 320 execute test software code that is built to test various aspects of RU 320. From operation 306 flow proceeds to operation 307.

In operation 307 of DECS-A 300, DECS-MM 218 updates a standard usage tier (SUT) library 322. In some embodiments, variations in tiers are used to meet variations in demands. In some embodiments, DECS-MM 218 clusters and orchestrates available resources in SUTs to build offerings for data consumers, such as consumers 212A. In some embodiments, SUTs are based on the resource offerings, such as CPU, RAM, data storage, connectivity, and the like. In some embodiments, SUTs are based on the availability of the DECS-D 212C, such as duration cycles of availability, committed/best effort availability, physical location of resource, type of connectivity with DECS-C, and the like. In some embodiments, SUTs are based on the performance observations of resources offered by DECS-D 212C, such a quality performance of resources and connectivity, reliability performance of the resources, duration of commitments, and the like. In some embodiments, SUTs are based on a combination of each of the listed criteria. In some embodiments, SUTs are calculated by providing a score for each criterion where the higher the score the higher the SUT for DECS-D 212C. Flow proceeds from operation 307 to operation 308.

As part of the resource reservation and utilization, in some embodiments, SUTs, once allocated, remain reserved with the designated DECS-C. In some embodiments, DECS-C resource usage is agreed upon in a contract. In some embodiments, a DECS report provides the performance of the resources. In some embodiments, in response to the expiration of a contract, either the contract is mutually renewed, or DECS-MM 218 follows a de-allocation sequence where the DECS-C is removed from the SUT library 322.

In operation 308 of DECS-A 300, an application provider or computational resource consumer (CRC) 324 is updated with RU availability of several DECS-Ds 112C. In some embodiments, the RU availability is updated in real-time. In some embodiments, RU availability is updated periodically. In some embodiments, RU availability is updated upon request by CRC 324. Flow proceeds from operation 308 to operation 309.

In operation 309 of DECS-A 300, CRC 324 confirms with DECS-MM 218 a selection of an RU. Flow proceeds from operation 309 to operation 310.

In operation 310 of DECS-A 300, DECS-MM 218 reserves the RU and notifies the DECS-C and waits for a response confirming the resource reservation. Flow proceeds from operation 310 to operation 311.

In operation 311 of DECS-A 300, in response to confirmation of the resource reservation, DECS-MM 218 installs a DECS agent on DECS-D 212C. In some embodiments, the DECS agent is a lightweight agent (e.g., a small software package) installed for DEC functionality. In some embodiments, the DECS agent is able to be downloaded as a play store application. In some embodiments, the DECS agent integrates available resources with DECS-MM 218. Flow proceeds from operation 311 to operation 312.

In operation 312 of DECS-A 300, in response to the DECS agent being installed, a readiness confirmation notifying of the agent installation is sent to CRC 324. Flow proceeds from operation 312 to operation 313.

In operation 313 of DECS-A 300, intimation to the application begins and application module 220 begins installing and initiating application software on DECS-D 212C at operation 314. Flow proceeds from operation 314 to operation 315.

In operation 315 of DECS-A 300, application module 220 intimates to data producers, such as producers 212B the DNS address of the installed DECS agent for forwarding data from producers 212B to be processed. Further, in operation 316, application module 220 intimates a source address for reception of data to a data consumer, such as consumer 112A. Flow proceeds from operation 316 to operation 317.

In operation 317 of DECS-A 300, data producers, such as producers 212B send produced data to the DECS agent on DECS-D 212C. DECS-D 212C processes the received produced data pursuant to installed application software. Upon completion of the data processing the data is forwarded to the data consumer, such as consumers 212A at operation 318. Flow proceeds from operation 318 to operation 319.

Figure 4:
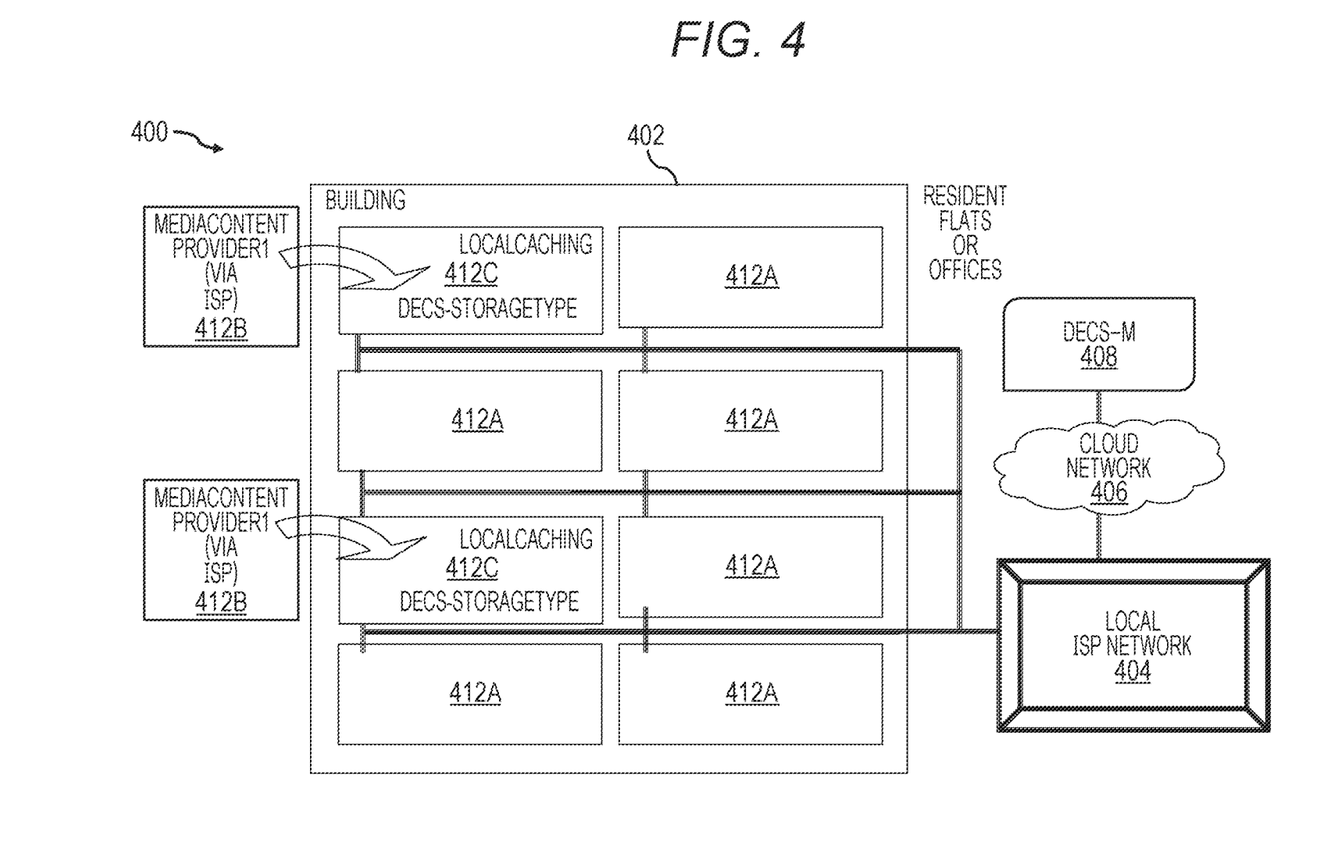
FIG. 4 is an example DECS, in accordance with some embodiments.

In operation 319 of DECS-A 300, the data consumer, such as consumer 112A, receives the processed data from the DECS agent FIG. 4 is an example DECS 400, in accordance with some embodiments.

DECS 400 includes a localized area, such as building 402, that represents a resident flat or an office space. Building 402 is connected to a local internet service provider (ISP) network 404, that is connected to cloud network 406 that is connected to a DECS-M 408. Providers 412B are in localized communication with DECS-D 412C which is in communication with consumers 412A.

In some embodiments, a user device, such as DECS-D 412C, with storage capacity (e.g., a hard disk drive (HDD)) connected to home Wi-Fi) acts as a caching device for providers 412B providing content to rest of consumers 412A in local network 404.

Figure 5:
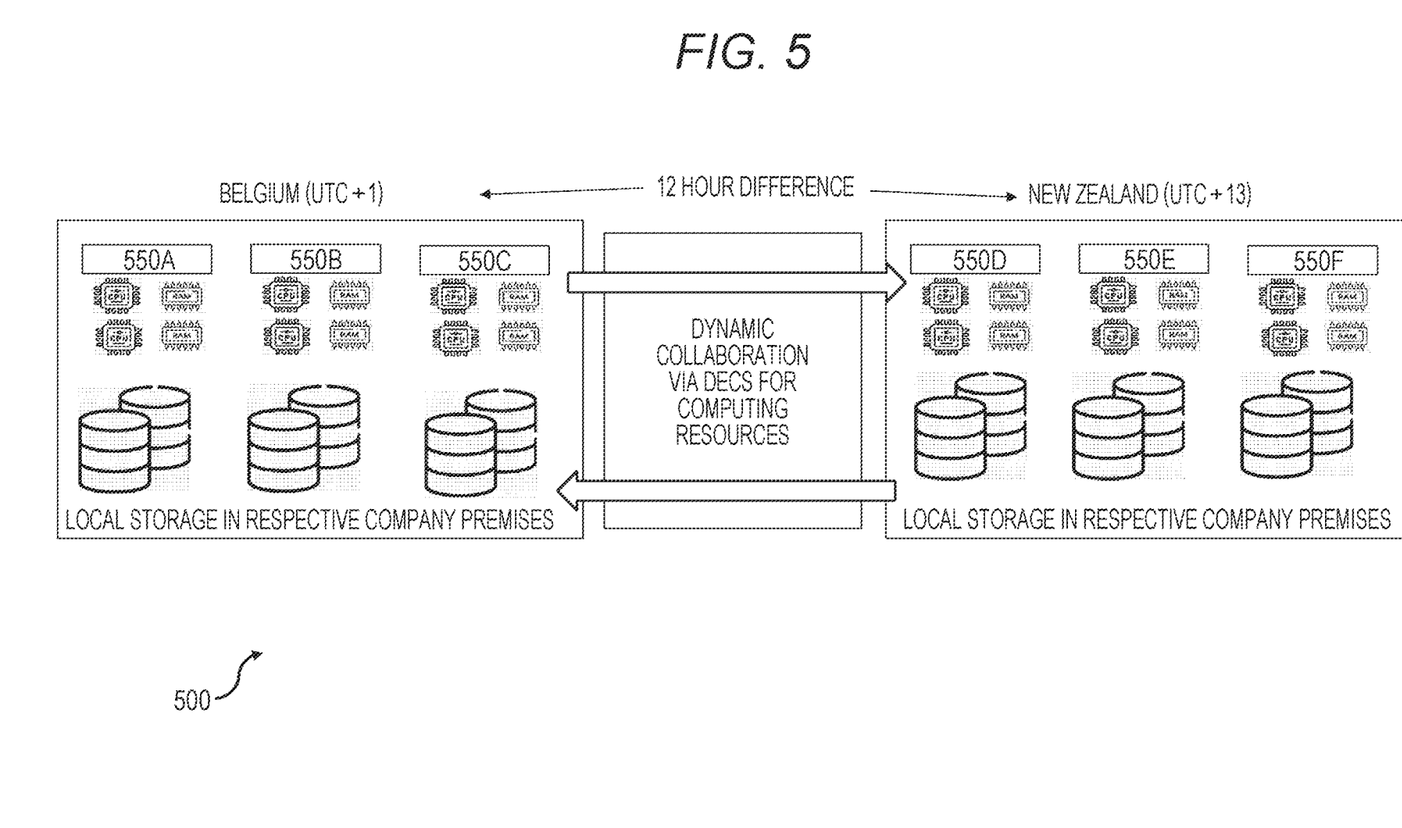
FIG. 5 is an example DECS, in accordance with some embodiments.

FIG. 5 is an example DECS 500, in accordance with some embodiments.

In some embodiments, several companies, 550A, 550B, 550C, 550D, 550E, and 550F, have several processing resources used during the daytime. In nighttime the computing resources have very low utilization, that leads to wastage in infrastructure capacity and impacting higher carbon footprint owing to waste of energy. Huge collaboration opportunity exists of secured solution with the help of DECS intermediary.

In a non-limiting example, companies 550A, 550B and/or 550C act as a DECS-D and process data for companies 550D, 550E, and/or 550F and return the data. That is, companies 550A, 550B, and 550C are 12 hours behind companies 550D, 550E, and 550F. Thus, during the evening hours companies 550A, 550B, and 550C operate as a DECS-D, while companies 550D, 550E, and 550F operate as both producers and consumers of data. Further, during the evening hours companies 550D, 550E, and 550F operate as a DECS-D, while companies 550A, 550B, and 550C operate as both producers and consumers of data.

Figure 6:
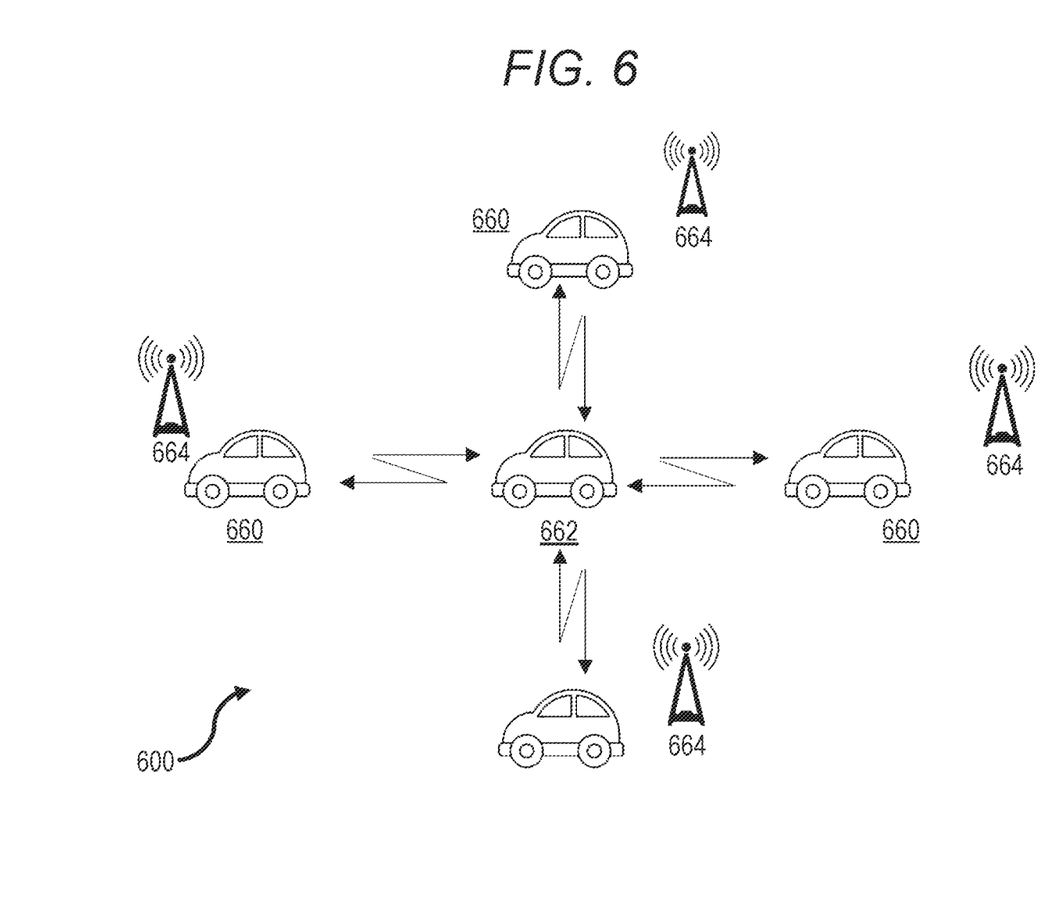
FIG. 6 is an example DECS, in accordance with some embodiments.

FIG. 6 is an example DECS 600, in accordance with some embodiments.

In some embodiments, where multiple cars 660 and 662 have UE connected to a core network by base stations 664 that are connected to RAN technology. In a scenario where each car 660 are acting as producer of data as well as a consumer of data device, a DECS application aides to connect near-by individual devices to DECS Agent 662. A DECS agent provides infrastructure resources to process local information received from near-by devices acting as producers, process the information pursuant to an application design and passes the information back to nearby consumer devices. Direct car-to-car localized communication, reducing dependency on V2X communication while aiding smart device communication like warning signals, traffic updates received from an application layer, route-plan sharing by neighbors etc.

Figure 7:
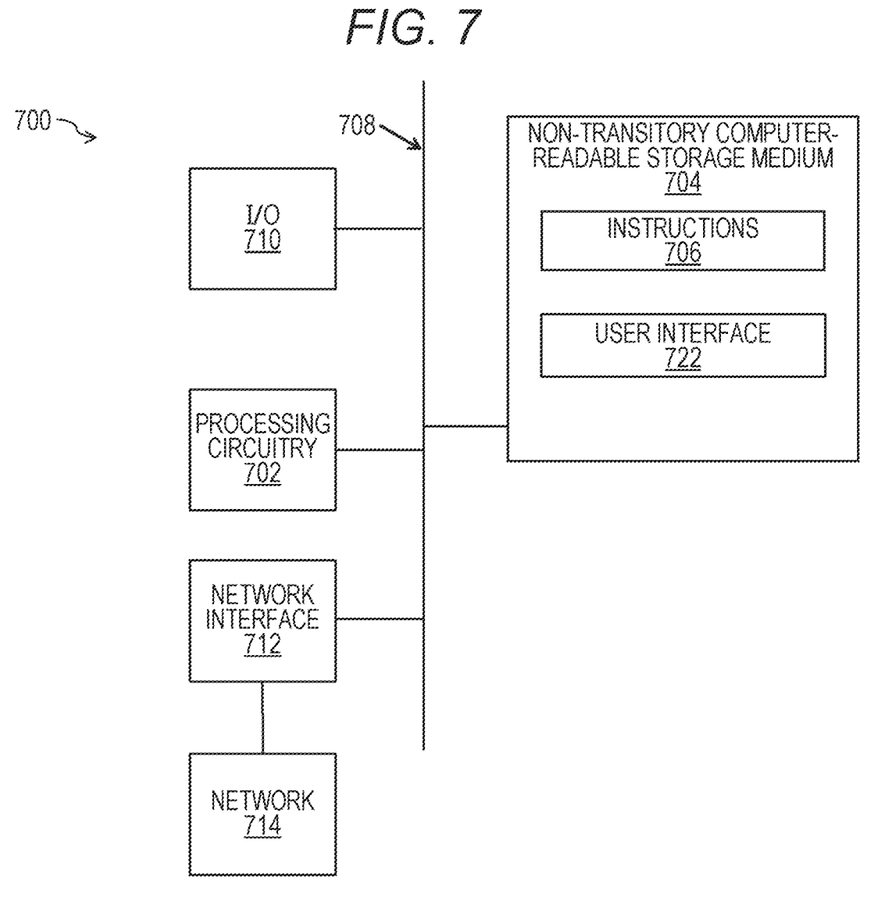
FIG. 7 is a high-level functional block diagram of a processor-based system, in accordance with some embodiments.

FIG. 7 is a block diagram of DECS processing circuitry 700 in accordance with some embodiments. In some embodiments, DECS processing circuitry 700 is a general-purpose computing device including a hardware processing circuitry 702 and a non-transitory, computer-readable storage medium 704. Storage medium 704, amongst other things, is encoded with, i.e., stores, computer program code, i.e., a set of executable instructions 706 such as DECS-A 300. Execution of instructions 706 by hardware processing circuitry 702 represents (at least in part) a DECS tool which implements a portion or of the methods described herein in accordance with one or more embodiments (hereinafter, the noted processes and/or methods).

Processing circuitry 702 is electrically coupled to a computer-readable storage medium 704 via a bus 708. Processing circuitry 702 is also electrically coupled to an I/O interface 710 by bus 708. A network interface 712 is also electrically connected to processing circuitry 702 via bus 708. Network interface 712 is connected to a network 714, so that processing circuitry 702 and computer-readable storage medium 704 are capable of connecting to external elements via network 714. Processing circuitry 702 is configured to execute computer program instructions 706 encoded in computer-readable storage medium 704 to cause affected node processing circuitry 700 to be usable for performing a portion of the noted processes and/or methods. In one or more embodiments, processing circuitry 702 is a central processing unit (CPU), a multi-processor, a distributed processing system, an application specific integrated circuit (ASIC), and/or a suitable processing unit.

In one or more embodiments, computer-readable storage medium 704 is an electronic, magnetic, optical, electromagnetic, infrared, and/or a semiconductor system (or apparatus or device). For example, computer-readable storage medium 704 includes a semiconductor or solid-state memory, a magnetic tape, a removable computer diskette, a random-access memory (RAM), a read-only memory (ROM), a rigid magnetic disk, and/or an optical disk. In one or more embodiments using optical disks, computer-readable storage medium 704 includes a compact disk-read only memory (CD-ROM), a compact disk-read/write (CD-R/W), and/or a digital video disc (DVD).

In one or more embodiments, storage medium 704 stores computer program code 706 configured to cause DECS processing circuitry 700 to be usable for performing a portion or of the noted processes and/or methods. In one or more embodiments, storage medium 704 also stores information, such as DECS-A 300 which facilitates performing a portion or of the noted processes and/or methods.

Affected node processing circuitry 700 includes I/O interface 710. I/O interface 710 is coupled to external circuitry. In one or more embodiments, I/O interface 710 includes a keyboard, keypad, mouse, trackball, trackpad, touchscreen, and/or cursor direction keys for communicating information and commands to processing circuitry 702.

Affected node processing circuitry 700 is also include network interface 712 coupled to processing circuitry 702. Network interface 712 allows DECS processing circuitry 700 to communicate with network 714, to which one or more other computer systems are connected. Network interface 712 includes wireless network interfaces such as BLUETOOTH, WIFI, WIMAX, GPRS, or WCDMA; or wired network interfaces such as ETHERNET, USB, or IEEE-864. In one or more embodiments, a portion or noted processes and/or methods, is implemented in two or more affected node processing circuitry 700.

DECS processing circuitry 700 is configured to receive information through I/O interface 710. The information received through I/O interface 710 includes one or more of instructions, data, design rules, libraries, and/or other parameters for processing by processing circuitry 702. The information is transferred to processing circuitry 702 via bus 708. DECS processing circuitry 700 is configured to receive information related to a UI through I/O interface 710. The information is stored in computer-readable medium 704 as user interface (UI) 722.

In some embodiments, a method for distributed edge computing (DEC) includes obtaining a request from a computational resource provider (CRP) offering computational resources of the CRP; validating the computation resources of the CRP; offering the computation resources of the CRP to a computational resource consumer (CRC); obtaining a reservation request from the CRC for a portion of the computation resources of the CRP; and installing CRC software on the CRP for DEC, where the CRP is configured to receive produced data related to the CRC software from a first localized device, the computational resources process the produced data, and forward processed data to a second localized device that has requested the processed data.

In some embodiments, the method further includes installing a DEC system (DECS) agent on the CRP, where the DECS agent is assigned a domain name system (DNS) address, the DNS address of the DECS agent having been provided to the first localized device so that the first localized device has the DNS address to forward the produced data to the CRP; and where the second localized device is notified of the DNS address in which to receive the processed data from the DECS agent.

In some embodiments, the method further includes, in response to receiving a computation resource reservation from the CRC, reserving the portion of the computation resources of the CRP for use by other CRC.

In some embodiments, the method further includes testing the computation resources of the CRP.

In some embodiments, the method further includes determining a standard usage tier (SUT) based on results of the computation resource testing.

In some embodiments, the method further includes updating a SUT library based on the computational resources of the CRP.

In some embodiments, the method further includes requesting use of at least a portion of the computation resources of the CRP.

In some embodiments, the method further includes validating the computation resources of the CRP based on a template, completed at the CRP, detailing the computation resources of the CRP.

In some embodiments, the method further includes verifying previous performance records of the computation resources of the CRP.

In some embodiments, a system includes a memory having non-transitory instructions stored; and processing circuitry coupled to the memory, and being configured to execute the non-transitory instructions, thereby causing the processing circuitry to obtain a request from a computational resource provider (CRP) offering computational resources of the CRP; validate the computation resources of the CRP; offer the computation resources of the CRP to a computational resource consumer (CRC); obtain a reservation request from the CRC for a portion of the computation resources of the CRP; and install CRC software on the CRP for DEC, where the CRP is configured to receive produced data related to the CRC software from a first localized device, the computational resources process the produced data, and forward processed data to a second localized device that has requested the processed data.

In some embodiments, the non-transitory instructions further cause the processing circuitry to install a DEC system (DECS) agent on the CRP, where the DECS agent is assigned a domain name system (DNS) address, the DNS address of the DECS agent having been provided to the first localized device so that the first localized device has the DNS address to forward the produced data to the CRP; and where the second localized device is notified of the DNS address in which to receive the processed data from the DECS agent.

In some embodiments, the non-transitory instructions further cause the processing circuitry to, in response to receiving a computation resource reservation from the CRC, reserve the portion of the computation resources of the CRP for use by the CRC.

In some embodiments, the non-transitory instructions further cause the processing circuitry to test the computation resources of the CRP.

In some embodiments, the non-transitory instructions further cause the processing circuitry to determine a standard usage tier (SUT) based on results of the computation resources testing.

In some embodiments, the non-transitory instructions further cause the processing circuitry to update a SUT library based on the computational resources of the CRP.

In some embodiments, a computer-readable medium including instructions executable by processing circuitry to cause the processing circuitry to perform operations including obtaining a request from a computational resource provider (CRP) offering computational resources of the CRP; validating the computation resources of the CRP; offering the computation resources of the CRP to a computational resource consumer (CRC); obtaining a reservation request from the CRC for a portion of the computation resources of the CRP; and installing CRC software on the CRP for DEC, where the CRP is configured to receive produced data related to the CRC software from a first localized device, the computational resources process the produced data, and forward processed data to a second localized device that has requested the processed data.

In some embodiments, the instructions further cause the processing circuitry to perform operations includes installing a DEC system (DECS) agent on the CRP, where the DECS agent is assigned a domain name system (DNS) address, the DNS address of the DECS agent having been provided to the first localized device so that the first localized device has the DNS address to forward the produced data to the CRP; and where the second localized device is notified of the DNS address in which to receive the processed data from the DECS agent.

In some embodiments, the instructions further cause the processing circuitry to perform operations including, in response to receiving a computation resource reservation from the CRC, reserving the portion of the computation resources of the CRP for use by the CRC.

In some embodiments, the instructions further cause the processing circuitry to perform operations including testing the computation resources of the CRP.

In some embodiments, the instructions further cause the processing circuitry to perform operations including determining a standard usage tier (SUT) based on results of the computation resources testing.

The foregoing outlines features of several embodiments so that those skilled in the art better understand the aspects of the present disclosure. Those skilled in the art should appreciate that they readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they make various changes, substitutions, and alterations herein without departing from the spirit and scope of the present disclosure.

What is claimed is:

1. A method for distributed edge computing (DEC), the method comprising:
   obtaining a request from a computational resource provider (CRP) offering computational resources of the CRP;
   validating the computation resources of the CRP, wherein validating the computation resources comprises determining a duration cycle of availability of the computation resources;
   offering the computation resources of the CRP to a computational resource consumer (CRC);
   obtaining a reservation request from the CRC for a portion of the computation resources of the CRP based on the duration cycle of availability;
   installing CRC software on the CRP for DEC, where the CRP is configured to receive produced data related to the CRC software from a first localized device, the computational resources process the produced data, and forward processed data to a second localized device that has requested the processed data; and
   installing a DEC system (DECS) agent on the CRP, where the DECS agent is assigned a domain name system (DNS) address, the DNS address of the DECS agent having been provided to the first localized device so that the first localized device has the DNS address to forward the produced data to the CRP; and
   wherein the second localized device is notified of the DNS address in which to receive the processed data from the DECS agent.

2. The method of claim 1, wherein the installing is performed by the CRC directly on the CRP.

3. The method of claim 1, further comprising:
   in response to receiving a computation resource reservation from the CRC, reserving the portion of the computation resources of the CRP for use by the CRC.

4. The method of claim 1, further comprising:
   testing the computation resources of the CRP.

5. The method of claim 4, further comprising:
   determining a standard usage tier (SUT) based on results of the computation resource testing.

6. The method of claim 5, further comprising:
   updating a SUT library based on the computational resources of the CRP.

7. The method of claim 1, further comprising:
   requesting use of at least a portion of the computation resources of the CRP.

8. The method of claim 7, further comprising:
validating the computation resources of the CRP based on a template, completed at the CRP, detailing the computation resources of the CRP.

9. The method of claim 8, further comprising:
verifying previous performance records of the computation resources of the CRP.

10. A system, comprising:
a memory having non-transitory instructions stored; and
processing circuitry coupled to the memory, and being configured to execute the non- transitory instructions, thereby causing the processing circuitry to:
 obtain a request from a computational resource provider (CRP) offering computational resources of the CRP;
 validate the computation resources of the CRP, wherein the processing circuitry is configured to validate the computation resources based on a duration cycle of availability of the computation resources;
 offer the computation resources of the CRP to a computational resource consumer (CRC);
 obtain a reservation request from the CRC for a portion of the computation resources of the CRP based on the duration cycle of availability;
 install CRC software on the CRP for DEC, where the CRP is configured to receive produced data related to the CRC software from a first localized device, the computational resources process the produced data, and forward processed data to a second localized device that has requested the processed data; and
 install a DEC system (DECS) agent on the CRP, where the DECS agent is assigned a domain name system (DNS) address, the DNS address of the DECS agent having been provided to the first localized device so that the first localized device has the DNS address to forward the produced data to the CRP; and
 wherein the second localized device is notified of the DNS address in which to receive the processed data from the DECS agent.

11. The system of claim 10, wherein the non-transitory instructions further cause the processing circuitry to:
instruct the CRC to install the CRC software directly on the CRP.

12. The system of claim 10, wherein the non-transitory instructions further cause the processing circuitry to:
in response to receiving a computation resource reservation from the CRC, reserve the portion of the computation resources of the CRP for use by the CRC.

13. The system of claim 10, wherein the non-transitory instructions further cause the processing circuitry to:
test the computation resources of the CRP.

14. The system of claim 13, wherein the non-transitory instructions further cause the processing circuitry to:
determine a standard usage tier (SUT) based on results of the computation resources testing.

15. The system of claim 14, wherein the non-transitory instructions further cause the processing circuitry to:
update a SUT library based on the computational resources of the CRP.

16. A non-transitory computer-readable medium including instructions executable by processing circuitry to cause the processing circuitry to perform operations comprising:
 obtaining a request from a computational resource provider (CRP) offering computational resources of the CRP;
 validating the computation resources of the CRP, wherein validating the computation resources comprises determining a duration cycle of availability of the computation resources;
 offering the computation resources of the CRP to a computational resource consumer (CRC);
 obtaining a reservation request from the CRC for a portion of the computation resources of the CRP based on the duration cycle of availability; and
 installing CRC software on the CRP for DEC, where the CRP is configured to receive produced data related to the CRC software from a first localized device, the computational resources process the produced data, and forward processed data to a second localized device that has requested the processed data; and
 installing a DEC system (DECS) agent on the CRP, where the DECS agent is assigned a domain name system (DNS) address, the DNS address of the DECS agent having been provided to the first localized device so that the first localized device has the DNS address to forward the produced data to the CRP; and
 wherein the second localized device is notified of the DNS address in which to receive the processed data from the DECS agent.

17. The non-transitory computer-readable medium of claim 16, wherein the instructions further cause the processing circuitry to perform operations comprising:
instructing the CRC to install the CRC software directly on the CRP.

18. The non-transitory computer-readable medium of claim 16, wherein the instructions further cause the processing circuitry to perform operations comprising:
in response to receiving a computation resource reservation from the CRC, reserving the portion of the computation resources of the CRP for use by the CRC.

19. The non-transitory computer-readable medium of claim 16, wherein the instructions further cause the processing circuitry to perform operations comprising:
testing the computation resources of the CRP.

20. The non-transitory computer-readable medium of claim 19, wherein the instructions further cause the processing circuitry to perform operations comprising:
determining a standard usage tier (SUT) based on results of the computation resources testing.

* * * * *